(12) United States Patent
Backlund et al.

(10) Patent No.: US 6,439,497 B1
(45) Date of Patent: Aug. 27, 2002

(54) METHOD AND DEVICE FOR MOUNTING A WINDING

(75) Inventors: Alberti Backlund, Hallstahammar; Mats Leijon, Vasteras, both of (SE)

(73) Assignee: ABB AB, Vasteras (SE)

( * ) Notice: Subject to any disclaimer, the term of this patent is extended or adjusted under 35 U.S.C. 154(b) by 0 days.

(21) Appl. No.: 09/355,752
(22) PCT Filed: Feb. 2, 1998
(86) PCT No.: PCT/SE98/00171
§ 371 (c)(1),
(2), (4) Date: Sep. 24, 1999
(87) PCT Pub. No.: WO98/34331
PCT Pub. Date: Aug. 6, 1998

(30) Foreign Application Priority Data

Feb. 3, 1997 (SE) .......................................... 9700364-4

(51) Int. Cl.⁷ .............................................. B65H 81/06
(52) U.S. Cl. ................. 242/430; 242/1.1 R; 242/433.3; 310/179; 310/180; 29/596
(58) Field of Search .......................... 242/433.2, 433.3, 242/439.5, 493, 566, 433; 29/596; 310/179, 180

(56) References Cited

U.S. PATENT DOCUMENTS

| 681,800 A | 9/1901 | Lasche |
| 847,008 A | 3/1907 | Kitsee |
| 1,304,451 A | 5/1919 | Burnham |
| 1,418,856 A | 6/1922 | Williamson |

(List continued on next page.)

FOREIGN PATENT DOCUMENTS

| AT | 399790 | 7/1995 |
| BE | 565063 | 2/1957 |
| CH | 391071 | 4/1965 |

(List continued on next page.)

OTHER PUBLICATIONS

US 5,545,863, 08/1996, Hildreth (withdrawn)

Shipboard Electrical Insulation; G. L. Moses, 1951, pp. 2&3.

(List continued on next page.)

Primary Examiner—Elvin Enad
(74) Attorney, Agent, or Firm—Oblon, Spivak, McClelland, Maier & Neustadt, P.C.

(57) ABSTRACT

In a method for mounting a cable winding, cable by cable, on a stator (S) for a generator a number of cables (K) of predetermined lengths are used for the intended winding. The method implies mounting each such cable starting at the stator slot representing the middle of an intended coil arc, the first cable half being mounted according to a winding diagram in one direction from the said center slot and other cable half being mounted according to the winding diagram in the opposite direction starting from the same center slot. The method is carried out by means of a device comprising a drum means, for instance in the form of a capstan machine (2), which originally supports the entire predetermined cable length of a cable. Further, there are two cable feeders (A, B) disposed on either side of the stator (S), which alternatively lay the cable (k) in the stator slots according to the winding diagram by means of intermediate storage means (3, 4).

21 Claims, 6 Drawing Sheets

U.S. PATENT DOCUMENTS

| | | |
|---|---|---|
| 1,481,585 A | 1/1924 | Beard |
| 1,508,456 A | 9/1924 | Lenz |
| 1,728,915 A | 9/1929 | Blankenship et al. |
| 1,742,985 A | 1/1930 | Burnham |
| 1,747,507 A | 2/1930 | George |
| 1,756,672 A | 4/1930 | Barr |
| 1,762,775 A | 6/1930 | Ganz |
| 1,781,308 A | 11/1930 | Vos |
| 1,861,182 A | 5/1932 | Hendey et al. |
| 1,904,885 A | 4/1933 | Seeley |
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Eans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschl et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A | 12/1961 | Shildneck |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Weidemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,705,459 A * | 12/1972 | Biddison ................ 29/597 |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowcz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Bruechkner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |

| | | | | | |
|---|---|---|---|---|---|
| 4,238,339 A | 12/1980 | Khutoretsky et al. | 4,590,416 A | 5/1986 | Porche et al. |
| 4,239,999 A | 12/1980 | Vinokurov et al. | 4,594,630 A | 6/1986 | Rabinowitz et al. |
| 4,245,182 A | 1/1981 | Aotsu et al. | 4,607,183 A | 8/1986 | Rieber et al. |
| 4,246,694 A | 1/1981 | Raschbichler et al. | 4,615,109 A | 10/1986 | Wcislo et al. |
| 4,255,684 A | 3/1981 | Mischler et al. | 4,615,778 A | 10/1986 | Elton |
| 4,258,280 A | 3/1981 | Starcevic | 4,616,788 A * | 10/1986 | Finegold .................... 242/7.03 |
| 4,262,209 A | 4/1981 | Berner | 4,618,795 A | 10/1986 | Cooper et al. |
| 4,274,027 A | 6/1981 | Higuchi et al. | 4,619,040 A | 10/1986 | Wang et al. |
| 4,281,264 A | 7/1981 | Keim et al. | 4,622,116 A | 11/1986 | Elton et al. |
| 4,292,558 A | 9/1981 | Flick et al. | 4,633,109 A | 12/1986 | Feigel |
| 4,307,311 A * | 12/1981 | Grozinger .................... 310/179 | 4,650,924 A | 3/1987 | Kauffman et al. |
| 4,308,476 A | 12/1981 | Schuler | 4,652,963 A | 3/1987 | Fahlen |
| 4,308,575 A | 12/1981 | Mase | 4,656,316 A | 4/1987 | Meltsch |
| 4,310,966 A | 1/1982 | Brietenbach | 4,656,379 A | 4/1987 | McCarty |
| 4,314,168 A | 2/1982 | Breitenbach | 4,677,328 A | 6/1987 | Kumakura |
| 4,317,001 A | 2/1982 | Silver et al. | 4,687,882 A | 8/1987 | Stone et al. |
| 4,320,645 A | 3/1982 | Stanley | 4,692,731 A | 9/1987 | Osinga |
| 4,321,426 A | 3/1982 | Schaeffer | 4,723,083 A | 2/1988 | Elton |
| 4,321,518 A | 3/1982 | Akamatsu | 4,723,104 A | 2/1988 | Rohatyn |
| 4,330,726 A | 5/1982 | Albright et al. | 4,724,345 A | 2/1988 | Elton et al. |
| 4,337,922 A | 7/1982 | Streiff et al. | 4,732,412 A | 3/1988 | van der Linden et al. |
| 4,341,989 A | 7/1982 | Sandberg et al. | 4,737,704 A | 4/1988 | Kalinnikov et al. |
| 4,347,449 A | 8/1982 | Beau | 4,745,314 A | 5/1988 | Nakano |
| 4,347,454 A | 8/1982 | Gellert et al. | 4,761,602 A | 8/1988 | Leibovich |
| 4,353,612 A | 10/1982 | Meyers | 4,766,365 A | 8/1988 | Bolduc et al. |
| 4,357,542 A | 11/1982 | Kirschbaum | 4,771,168 A | 9/1988 | Gundersen et al. |
| 4,360,748 A | 11/1982 | Raschbichler et al. | 4,785,138 A | 11/1988 | Brietenbach et al. |
| 4,361,723 A | 11/1982 | Hvizd, Jr. et al. | 4,795,933 A | 1/1989 | Sakai |
| 4,365,178 A | 12/1982 | Lexz | 4,827,172 A | 5/1989 | Kobayashi |
| 4,367,425 A | 1/1983 | Mendelsohn et al. | 4,836,461 A * | 6/1989 | Koizui et al. ............ 242/433.3 |
| 4,367,890 A | 1/1983 | Spirk | 4,845,308 A | 7/1989 | Womack, Jr. et al. |
| 4,368,418 A | 1/1983 | Demello et al. | 4,847,747 A | 7/1989 | Abbondanti |
| 4,369,389 A | 1/1983 | Lambrecht | 4,853,565 A | 8/1989 | Elton et al. |
| 4,371,745 A | 2/1983 | Sakashita | 4,859,810 A | 8/1989 | Cloetens et al. |
| 4,384,944 A | 5/1983 | Silver et al. | 4,859,989 A | 8/1989 | McPherson |
| 4,387,316 A | 6/1983 | Katsekas | 4,860,430 A | 8/1989 | Raschbichler et al. |
| 4,401,920 A | 8/1983 | Taylor et al. | 4,864,266 A | 9/1989 | Feather et al. |
| 4,403,163 A | 9/1983 | Rarmerding et al. | 4,883,230 A | 11/1989 | Lindstrom |
| 4,404,486 A | 9/1983 | Keim et al. | 4,890,040 A | 12/1989 | Gundersen |
| 4,411,710 A | 10/1983 | Mochizuki et al. | 4,894,284 A | 1/1990 | Yamanouchi et al. |
| 4,421,284 A | 12/1983 | Pan | 4,914,386 A | 4/1990 | Zocholl |
| 4,425,521 A | 1/1984 | Rosenberry, Jr. et al. | 4,918,347 A | 4/1990 | Takaba |
| 4,426,771 A | 1/1984 | Wang et al. | 4,918,835 A | 4/1990 | Wcislo et al. |
| 4,429,244 A | 1/1984 | Nikiten et al. | 4,924,342 A | 5/1990 | Lee |
| 4,431,960 A | 2/1984 | Zucker | 4,926,079 A | 5/1990 | Niemela e tal. |
| 4,432,029 A | 2/1984 | Lundqvist | 4,942,326 A | 7/1990 | Butler, III et al. |
| 4,437,464 A | 3/1984 | Crow | 4,949,001 A | 8/1990 | Campbell |
| 4,443,725 A | 4/1984 | Derderian et al. | 4,982,147 A | 1/1991 | Lauw |
| 4,459,742 A * | 7/1984 | Banner ........................ 29/597 | 4,994,952 A | 2/1991 | Silva et al. |
| 4,470,884 A | 9/1984 | Carr | 4,997,995 A | 3/1991 | Simmons et al. |
| 4,473,765 A | 9/1984 | Butman, Jr. et al. | 5,012,125 A | 4/1991 | Conway |
| 4,475,075 A | 10/1984 | Munn | 5,030,813 A | 7/1991 | Stanisz |
| 4,477,690 A | 10/1984 | Nikitin et al. | 5,036,165 A | 7/1991 | Elton et al. |
| 4,481,438 A | 11/1984 | Keim | 5,036,238 A | 7/1991 | Tajima |
| 4,484,106 A | 11/1984 | Taylor et al. | 5,066,881 A | 11/1991 | Elton et al. |
| 4,488,079 A | 12/1984 | Dailey et al. | 5,067,046 A | 11/1991 | Elton et al. |
| 4,490,651 A | 12/1984 | Taylor et al. | 5,083,360 A | 1/1992 | Valencic et al. |
| 4,503,284 A | 3/1985 | Minnick et al. | 5,086,246 A | 2/1992 | Dymond et al. |
| 4,508,251 A | 4/1985 | Harada et al. | 5,091,609 A | 2/1992 | Swada et al. |
| 4,510,077 A | 4/1985 | Elton | 5,094,703 A | 3/1992 | Takaoka et al. |
| 4,517,471 A | 5/1985 | Sachs | 5,095,175 A | 3/1992 | Yoshida et al. |
| 4,520,287 A | 5/1985 | Wang et al. | 5,097,241 A | 3/1992 | Smith et al. |
| 4,523,249 A | 6/1985 | Arimoto | 5,097,591 A | 3/1992 | Wcislo et al. |
| 4,538,131 A | 8/1985 | Baier et al. | 5,111,095 A | 5/1992 | Hendershot |
| 4,546,210 A | 10/1985 | Akiba et al. | 5,124,607 A | 6/1992 | Rieber et al. |
| 4,551,780 A | 11/1985 | Canay | 5,136,459 A | 8/1992 | Fararooy |
| 4,557,038 A | 12/1985 | Wcislo et al. | 5,140,290 A | 8/1992 | Dersch |
| 4,560,896 A | 12/1985 | Vogt et al. | 5,153,460 A | 10/1992 | Bovino et al. |
| 4,565,929 A | 1/1986 | Baskin et al. | 5,168,662 A | 12/1992 | Nakamura et al. |
| 4,571,453 A | 2/1986 | Takaoka et al. | 5,171,941 A | 12/1992 | Shimizu et al. |
| 4,588,916 A | 5/1986 | Lis | 5,182,537 A | 1/1993 | Thuis |

| | | | | | | |
|---|---|---|---|---|---|---|
| 5,187,428 A | | 2/1993 | Hutchison et al. | DE | 501181 | 7/1930 |
| 5,187,858 A | * | 2/1993 | Murakoshi et al. ............ 29/596 | DE | 523047 | 4/1931 |
| 5,193,755 A | * | 3/1993 | Luciani ................... 242/433.3 | DE | 568508 | 1/1933 |
| 5,231,249 A | | 7/1993 | Kimura et al. | DE | 572030 | 3/1933 |
| 5,235,488 A | | 8/1993 | Koch | DE | 584639 | 9/1933 |
| 5,246,783 A | | 9/1993 | Spenadel et al. | DE | 586121 | 10/1933 |
| 5,264,778 A | | 11/1993 | Kimmel et al. | DE | 604972 | 11/1934 |
| 5,287,262 A | | 2/1994 | Klein | DE | 629301 | 4/1936 |
| 5,304,883 A | | 4/1994 | Denk | DE | 673545 | 3/1939 |
| 5,305,961 A | | 4/1994 | Errard et al. | DE | 719009 | 3/1942 |
| 5,321,308 A | | 6/1994 | Johncock | DE | 846583 | 8/1952 |
| 5,323,330 A | | 6/1994 | Asplund et al. | DE | 875227 | 4/1953 |
| 5,325,008 A | | 6/1994 | Grant | DE | 565063 | 7/1960 |
| 5,325,259 A | | 6/1994 | Paulsson | DE | 975999 | 1/1963 |
| 5,327,637 A | | 7/1994 | Britenbach et al. | DE | 1465719 | 5/1969 |
| 5,341,281 A | | 8/1994 | Skibinski | DE | 1807391 | 5/1970 |
| 5,343,139 A | | 8/1994 | Gyugyi et al. | DE | 2050674 | 5/1971 |
| 5,355,046 A | | 10/1994 | Weigelt | DE | 1638176 | 6/1971 |
| 5,365,132 A | | 11/1994 | Hann et al. | DE | 2155371 | 5/1973 |
| 5,387,890 A | | 2/1995 | Estop et al. | DE | 24006698 | 7/1975 |
| 5,397,513 A | | 3/1995 | Steketee, Jr. | DE | 252051 | 11/1976 |
| 5,399,941 A | | 3/1995 | Grothaus et al. | DE | 2656389 | 6/1978 |
| 5,400,005 A | | 3/1995 | Bobry | DE | 2721905 | 11/1978 |
| 5,408,169 A | | 4/1995 | Jeanneret | DE | 137164 | 8/1979 |
| 5,449,861 A | | 9/1995 | Fujino et al. | DE | 138840 | 11/1979 |
| 5,452,170 A | | 9/1995 | Ohde et al. | DE | 2824951 | 12/1979 |
| 5,468,916 A | | 11/1995 | Litenas et al. | DE | 2835386 | 2/1980 |
| 5,499,178 A | | 3/1996 | Mohan | DE | 2839517 | 3/1980 |
| 5,500,632 A | | 3/1996 | Halser, III | DE | 2854520 | 6/1980 |
| 5,510,942 A | | 4/1996 | Bock et al. | DE | 3009102 | 9/1980 |
| 5,530,307 A | | 6/1996 | Horst | DE | 2913697 | 10/1980 |
| 5,533,568 A | | 7/1996 | Benedict et al. | DE | 2920478 | 12/1980 |
| 5,534,754 A | | 7/1996 | Poumey | DE | 3028777 | 3/1981 |
| 5,550,410 A | | 8/1996 | Titus | DE | 2939004 | 4/1981 |
| 5,583,387 A | | 12/1996 | Takeuchi et al. | DE | 3006382 | 8/1981 |
| 5,587,126 A | | 12/1996 | Steketee, Jr. | DE | 3008818 | 9/1981 |
| 5,598,137 A | | 1/1997 | Alber et al. | DE | 209313 | 4/1984 |
| 5,607,320 A | | 3/1997 | Wright | DE | 3305225 | 8/1984 |
| 5,612,510 A | | 3/1997 | Hildreth | DE | 3309051 | 9/1984 |
| 5,663,605 A | | 9/1997 | Evans et al. | DE | 3441311 | 5/1986 |
| 5,672,926 A | | 9/1997 | Brandes et al. | DE | 3543106 | 6/1987 |
| 5,689,223 A | | 11/1997 | Demarmels et al. | DE | 2917717 | 8/1987 |
| 5,794,884 A | * | 8/1998 | Dolgas et al. ............ 242/433.3 | DE | 3612112 | 10/1987 |
| 5,807,447 A | | 9/1998 | Forrest | DE | 3726346 | 2/1989 |
| 5,834,699 A | | 11/1998 | Buck et al. | DE | 3925337 | 2/1991 |
| | | | | DE | 4023903 | 11/1991 |
| | | FOREIGN PATENT DOCUMENTS | | DE | 4022476 | 1/1992 |
| CH | | 266037 | 10/1965 | DE | 4233558 | 3/1994 |
| CH | | 534448 | 2/1973 | DE | 4402184 | 8/1995 |
| CH | | 539328 | 7/1973 | DE | 4409794 | 8/1995 |
| CH | | 646403 | 2/1979 | DE | 4412761 | 10/1995 |
| CH | | 657482 | 8/1986 | DE | 4420322 | 12/1995 |
| CH | | 1189322 | 10/1986 | DE | 19620906 | 1/1996 |
| DE | | 40414 | 8/1887 | DE | 4438186 | 5/1996 |
| DE | | 134022 | 12/1901 | DE | 19020222 | 3/1997 |
| DE | | 277012 | 7/1914 | DE | 19547229 | 6/1997 |
| DE | | 336418 | 6/1920 | EP | 049104 | 4/1982 |
| DE | | 372390 | 3/1923 | EP | 0493704 | 4/1982 |
| DE | | 386561 | 12/1923 | EP | 0056580 A1 | 7/1982 |
| DE | | 387973 | 1/1924 | EP | 078908 | 5/1983 |
| DE | | 406371 | 11/1924 | EP | 0120154 | 10/1984 |
| DE | | 425551 | 2/1926 | EP | 0130124 | 1/1985 |
| DE | | 426793 | 3/1926 | EP | 0142813 | 5/1985 |
| DE | | 432169 | 7/1926 | EP | 0155405 | 9/1985 |
| DE | | 433749 | 9/1926 | EP | 0102513 | 1/1986 |
| DE | | 435608 | 10/1926 | EP | 0174783 | 3/1986 |
| DE | | 435609 | 10/1926 | EP | 0185788 | 7/1986 |
| DE | | 441717 | 3/1927 | EP | 0277358 | 8/1986 |
| DE | | 443011 | 4/1927 | EP | 0234521 | 9/1987 |
| DE | | 460124 | 5/1928 | EP | 0244069 | 11/1987 |
| DE | | 482506 | 9/1929 | EP | 0246377 | 11/1987 |

| | | | | | |
|---|---|---|---|---|---|
| EP | 0265868 | 5/1988 | GB | 739962 | 11/1955 |
| EP | 0274691 | 7/1988 | GB | 763761 | 12/1956 |
| EP | 0282876 | 9/1988 | GB | 805721 | 12/1958 |
| EP | 2080759 | 9/1988 | GB | 827600 | 2/1960 |
| EP | 0309096 | 3/1989 | GB | 854728 | 11/1960 |
| EP | 0314860 | 5/1989 | GB | 870583 | 6/1961 |
| EP | 0316911 | 5/1989 | GB | 913386 | 12/1962 |
| EP | 0317248 | 5/1989 | GB | 965741 | 8/1964 |
| EP | 0335430 | 10/1989 | GB | 992249 | 5/1965 |
| EP | 0342554 | 11/1989 | GB | 1024583 | 3/1966 |
| EP | 0221404 | 5/1990 | GB | 1053337 | 12/1966 |
| EP | 0375101 | 6/1990 | GB | 1059123 | 2/1967 |
| EP | 0406437 | 1/1991 | GB | 1103098 | 2/1968 |
| EP | 0439410 | 7/1991 | GB | 1103099 | 2/1968 |
| EP | 0440865 | 8/1991 | GB | 1117401 | 6/1968 |
| EP | 0469155 A1 | 2/1992 | GB | 1135242 | 12/1968 |
| EP | 0490705 | 6/1992 | GB | 1147049 | 4/1969 |
| EP | 0503817 | 9/1992 | GB | 1157885 | 7/1969 |
| EP | 0571155 | 11/1993 | GB | 1174659 | 12/1969 |
| EP | 0620570 | 10/1994 | GB | 1236082 | 6/1971 |
| EP | 0620630 | 10/1994 | GB | 1268770 | 3/1972 |
| EP | 0642027 | 3/1995 | GB | 1319257 | 6/1973 |
| EP | 0671632 | 9/1995 | GB | 1322433 | 7/1973 |
| EP | 0676777 | 10/1995 | GB | 1340983 | 12/1973 |
| EP | 0677915 | 10/1995 | GB | 1341050 | 12/1973 |
| EP | 0684679 | 11/1995 | GB | 1365191 | 8/1974 |
| EP | 0684682 | 11/1995 | GB | 1395152 | 5/1975 |
| EP | 0695019 | 1/1996 | GB | 1424982 | 2/1976 |
| EP | 0732787 | 9/1996 | GB | 142654 | 3/1976 |
| EP | 0738034 | 10/1996 | GB | 1438610 | 6/1976 |
| EP | 0739087 A2 | 10/1996 | GB | 1445284 | 8/1976 |
| EP | 0740315 | 10/1996 | GB | 1479904 | 7/1977 |
| EP | 0749190 A2 | 12/1996 | GB | 1493163 | 11/1977 |
| EP | 0751605 | 1/1997 | GB | 1502938 | 3/1978 |
| EP | 0739087 A3 | 3/1997 | GB | 1525745 | 9/1978 |
| EP | 0749193 A3 | 3/1997 | GB | 2000625 | 1/1979 |
| EP | 0780926 | 6/1997 | GB | 1548633 | 7/1979 |
| EP | 0802542 | 10/1997 | GB | 2022327 | 12/1979 |
| EP | 0913912 A1 | 5/1999 | GB | 2025150 | 1/1980 |
| FR | 805544 | 4/1936 | GB | 2034101 | 5/1980 |
| FR | 841351 | 1/1938 | GB | 1574796 | 9/1980 |
| FR | 847899 | 12/1938 | GB | 2070341 | 9/1981 |
| FR | 916959 | 12/1946 | GB | 2070470 | 9/1981 |
| FR | 1011924 | 4/1949 | GB | 2071433 | 9/1981 |
| FR | 1126975 | 3/1955 | GB | 2081523 | 2/1982 |
| FR | 1238795 | 7/1959 | GB | 2099635 | 12/1982 |
| FR | 2108171 | 5/1972 | GB | 2105925 | 3/1983 |
| FR | 2251938 | 6/1975 | GB | 2106306 | 4/1983 |
| FR | 2305879 | 10/1976 | GB | 2106721 | 4/1983 |
| FR | 2376542 | 7/1978 | GB | 2136214 | 9/1984 |
| FR | 2467502 | 4/1981 | GB | 2140195 | 11/1984 |
| FR | 2481531 | 10/1981 | GB | 2150153 | 6/1985 |
| FR | 2556146 | 6/1985 | GB | 2268337 | 1/1994 |
| FR | 2 594 271 | 8/1987 | GB | 2273819 | 6/1994 |
| FR | 2594271 | 8/1987 | GB | 2283133 | 4/1995 |
| FR | 2708157 | 1/1995 | GB | 2289992 | 12/1995 |
| FR | 2 708 157 | 1/1995 | GB | 2308490 | 6/1997 |
| GB | 123906 | 3/1919 | GB | 468827 | 7/1997 |
| GB | 268271 | 3/1927 | GB | 2046142 | 11/1997 |
| GB | 293861 | 11/1928 | GB | 2332557 | 6/1999 |
| GB | 292999 | 4/1929 | HU | 175494 | 11/1981 |
| GB | 319313 | 7/1929 | JP | 60206121 | 3/1959 |
| GB | 518993 | 3/1940 | JP | 57043529 | 8/1980 |
| GB | 537609 | 6/1941 | JP | 57126117 | 5/1982 |
| GB | 540456 | 10/1941 | JP | 59076156 | 10/1982 |
| GB | 589071 | 6/1947 | JP | 59159642 | 2/1983 |
| GB | 666883 | 2/1952 | JP | 6264964 | 9/1985 |
| GB | 685416 | 1/1953 | JP | 1129737 | 5/1989 |
| GB | 702892 | 1/1954 | JP | 62320621 | 6/1989 |
| GB | 715226 | 9/1954 | JP | 2017474 | 1/1990 |
| GB | 723457 | 2/1955 | JP | 3245748 | 2/1990 |

| | | | | | |
|---|---|---|---|---|---|
| JP | 4179107 | 11/1990 | WO | WO9745921 | 12/1997 |
| JP | 318253 | 1/1991 | WO | WO9745922 | 12/1997 |
| JP | 424909 | 1/1992 | WO | WO9745923 | 12/1997 |
| JP | 5290947 | 4/1992 | WO | WO9745924 | 12/1997 |
| JP | 6196343 | 12/1992 | WO | WO9745925 | 12/1997 |
| JP | 62334442 | 2/1993 | WO | WO9745926 | 12/1997 |
| JP | 6325629 | 5/1993 | WO | WO9745928 | 12/1997 |
| JP | 7057951 | 8/1993 | WO | WO9745929 | 12/1997 |
| JP | 7264789 | 3/1994 | WO | WO9745930 | 12/1997 |
| JP | 8167332 | 12/1994 | WO | WO9745931 | 12/1997 |
| JP | 7161270 | 6/1995 | WO | WO9745932 | 12/1997 |
| JP | 8264039 | 11/1995 | WO | WO9745934 | 12/1997 |
| JP | 9200989 | 1/1996 | WO | WO9745935 | 12/1997 |
| JP | 8036952 | 2/1996 | WO | WO9745936 | 12/1997 |
| JP | 8167360 | 6/1996 | WO | WO9745937 | 12/1997 |
| LU | 67199 | 3/1972 | WO | WO9745938 | 12/1997 |
| SE | 90308 | 9/1937 | WO | WO9745939 | 12/1997 |
| SE | 305899 | 11/1968 | WO | WO9747067 | 12/1997 |
| SE | 255156 | 2/1969 | WO | WO9820595 | 5/1998 |
| SE | 341428 | 12/1974 | WO | WO9820596 | 5/1998 |
| SE | 453236 | 1/1982 | WO | WO9820597 | 5/1998 |
| SE | 457792 | 6/1987 | WO | WO 98/20598 | 5/1998 |
| SE | 502417 | 12/1993 | WO | WO9820600 | 5/1998 |
| SU | 792302 | 1/1971 | WO | WO 98/20602 | 5/1998 |
| SU | 425268 | 9/1974 | WO | WO9821385 | 5/1998 |
| SU | 1019553 | 1/1980 | WO | PCT/FR 98/00468 | 6/1998 |
| SU | 694939 | 1/1982 | WO | WO9827634 | 6/1998 |
| SU | 955369 | 8/1982 | WO | WO9827635 | 6/1998 |
| SU | 1511810 | 5/1987 | WO | WO9827636 | 6/1998 |
| WO | WO8202617 | 8/1982 | WO | WO9834315 | 6/1998 |
| WO | WO8502302 | 5/1985 | WO | WO9829927 | 7/1998 |
| WO | WO9011389 | 10/1990 | WO | WO9829928 | 7/1998 |
| WO | WO9012409 | 10/1990 | WO | WO9829929 | 7/1998 |
| WO | PCT/DE 90/00279 | 11/1990 | WO | WO9829930 | 7/1998 |
| WO | WO9101059 | 1/1991 | WO | WO9829931 | 7/1998 |
| WO | WO910585 | 2/1991 | WO | WO9829932 | 7/1998 |
| WO | WO9107807 | 3/1991 | WO | WO9833731 | 8/1998 |
| WO | PCT SE 91/00077 | 4/1991 | WO | WO9833736 | 8/1998 |
| WO | WO9109442 | 6/1991 | WO | WO9833737 | 8/1998 |
| WO | WO 91/11841 | 8/1991 | WO | WO9834238 | 8/1998 |
| WO | WO8115862 | 10/1991 | WO | WO 98/34239 | 8/1998 |
| WO | WO 91/15755 | 10/1991 | WO | WO9834240 | 8/1998 |
| WO | WO9201328 | 1/1992 | WO | WO9834241 | 8/1998 |
| WO | WO9203870 | 3/1992 | WO | WO9834242 | 8/1998 |
| WO | WO9406194 | 3/1994 | WO | WO9834243 | 8/1998 |
| WO | WO9518058 | 7/1995 | WO | WO9834244 | 8/1998 |
| WO | WO9522153 | 8/1995 | WO | WO9834245 | 8/1998 |
| WO | WO9524049 | 9/1995 | WO | WO9834246 | 8/1998 |
| WO | WO9622606 | 7/1996 | WO | WO9834247 | 8/1998 |
| WO | WO9622607 | 7/1996 | WO | WO9834248 | 8/1998 |
| WO | WO9321681 | 10/1996 | WO | WO9834249 | 8/1998 |
| WO | PCT/CN 96/00010 | 10/1996 | WO | WO9834250 | 8/1998 |
| WO | WO9630144 | 10/1996 | WO | WO9834309 | 8/1998 |
| WO | WO9710640 | 3/1997 | WO | WO9834312 | 8/1998 |
| WO | WO9711831 | 4/1997 | WO | WO9834321 | 8/1998 |
| WO | WO9716881 | 5/1997 | WO | WO9834322 | 8/1998 |
| WO | WO 97/29494 | 8/1997 | WO | WO9834323 | 8/1998 |
| WO | WO45927 | 12/1997 | WO | WO9834325 | 8/1998 |
| WO | WO45933 | 12/1997 | WO | WO9834326 | 8/1998 |
| WO | WO975918 | 12/1997 | WO | WO9834327 | 8/1998 |
| WO | WO9745288 | 12/1997 | WO | WO9834328 | 8/1998 |
| WO | WO9745847 | 12/1997 | WO | WO9834329 | 8/1998 |
| WO | WO9745848 | 12/1997 | WO | WO9834330 | 8/1998 |
| WO | WO9745906 | 12/1997 | WO | WO9834331 | 8/1998 |
| WO | WO9745907 | 12/1997 | WO | WO 98/40627 | 9/1998 |
| WO | WO9745912 | 12/1997 | WO | WO 98/43336 | 10/1998 |
| WO | WO9745914 | 12/1997 | WO | WO9917309 | 4/1999 |
| WO | WO9745915 | 12/1997 | WO | WO9917311 | 4/1999 |
| WO | WO9745916 | 12/1997 | WO | WO9917312 | 4/1999 |
| WO | WO9745919 | 12/1997 | WO | WO9917313 | 4/1999 |
| WO | WO9745920 | 12/1997 | WO | WO9917314 | 4/1999 |

| | | |
|---|---|---|
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | WO928930 | 6/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

ABB Elkrafthandbok; ABB AB; 1988 ; pp. 274–276.

Elkraft teknisk Handbok, 2 Elmaskiner; A. Alfredsson et al; 1988, pp. 121–123.

High Voltage Cables in a New Class of Generators Powerformer; M. Leijon et al; Jun. 14, 1999; pp. 1–8.

Ohne Tranformator direkt ins Netz; Owman et al, ABB, AB; Feb. 8, 1999; pp. 48–51.

Submersible Motors and Wet–Rotor Motors for Centrifugal Pumps Submerged in the Fluid Handled; K.. Bienick, KSB; Feb. 25, 1988; pp. 9–17.

High Voltage Generators; G. Beschastnov et al; 1977; vol. 48. No. 6 pp. 1–7.

Eine neue Type von Unterwassermotoren; Electrotechnik und Maschinenbam, 49; Aug. 1931; pp. 2–3.

Problems in design of the 110–5OokV high–voltage generators; NIkiti et al; World Electrotechnical Congress; 6/21–27/77; Section 1. Paper #18.

Manufacture and Testing of Roebel bars; P. Marti et al; 1960, Pub.86, vol. 8, pp. 25–31.

Hydroalternators of 110 to 220 kV Elektrotechn. Obz., vol. 64, No. 3, pp. I32–136 Mar. 1975; A. Abramov.

Design Concepts for an Amorphous Metal Distribution Transformer, E. Boyd et al; IEEE Nov. 1984.

Neue Wege zum Bau zweipoliger Tubogeneratoren bis 2 GVA, 60kV Elektrotechnik und Maschinenbau Wien Janner 1972, Heft 1, Seite 1 –11; G. Aichholzer.

Optimizing designs of water–resistant magnet wire; V. Kuzenev et al; Elektrotekhnika, vol. 59, No. 12, pp. 35–40, 1988.

Zur Entwicklung der Tauchpumpenmotoren; A. Schanz; KSB, pp. 19–24.

Direct Generation of alternating current at high voltages; R. Parsons; IEEE Journal, vol. 67 #393, Jan. 15, 1929; pp. 1065–1080.

Stopfbachslose Umwalzpumpen– ein wichtiges Element im modernen Kraftwerkbau; H. Holz, KSB 1, pp. 13–19, 1960.

Zur Geschichte der Brown Boveri–Synchron–Maschinen; Vierzig Jahre Generatorbau; Jan.–Feb. 1931 pp. 15–39.

Technik und Anwendung moderner Tauchpumpen; A. Heumann; 1987.

High capacity synchronous generator having no tooth stator; V.S. Kildishev et al; No. 1, 1977 pp. 11–16.

Der Asynchronmotor als Antrieb stopfbcichsloser Pumpen; E. Picmaus; Eletrotechnik und Maschinenbay No. 78, pp. 153–155, 1961.

Low core loss rotating flux transformer; R. F. Krause, et al; American Institute Physics J.Appl.Phys vol. 64 #10 Nov. 1988, pp. 5376–5378.

An EHV bulk Power transmission line Made with Low Loss XLPE Cable;Ichihara et al; 8/92; pp. 3–6.

Underground Transmission Systems Reference Book; 1992;pp16–19; pp. 36–45; pp. 67–81.

Power System Stability and Control; P. Kundur, 1994; pp. 23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp. 2694–2701.

Six phase Synchronous Machine with AC and DC Stator Connections, Part 1: Equivalent circuit representation and Steady–State Analysis; R. Schiferl et al; Aug. 1983; pp. 2685–2693.

Reactive Power Compensation; T. Petersson; 1993; pp. 1–23.

Permanent Magnet Machines; K. Binns; 1987; pp. 9–1 through 9–26.

Hochspannungsaniagen for Wechselstrom; 97. Hochspannungsaufgaben an Generatoren und Motoren; Roth et al; 1938; pp. 452–455.

Hochspannungsanlagen for Wechselstrom; 97. Hochspannungsaufgaben an Generatoren und Motoren; Roth et al; Spring 1959, pp. 30–33.

Neue Lbsungswege zum Entwurf grosser Turbogeneratoren bis 2GVA, 6OkV; G. Aicholzer; Sep. 1974, pp. 249–255.

Advanced Turbine–generators– an assessment; A. Appleton, et al; International Conf. Proceedings, Lg HV Elec. Sys. Paris, FR, Aug.–Sep./1976, vol I, Section 11–02, pp. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

PowerFormer ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp. 330–334.

Development of extruded polymer insulated superconducting cable; Jan. 1992.

Transformer core losses; B. Richardson; Proc. IEEE May 1986, pp. 365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a self–tuned ac filter in the Konti–Skan 2 HVDC Link; T. Holmgren,G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp. 64–70.*

Analysis of faulted Power Systems; P Anderson, Iowa State University Press / Ames, Iowa, 1973, pp. 255–257.*

36–Kv. Generators Arise from Insulation Research; P. Sidler; *Electrical World* Oct. 15, 1932, p. 524.*

Oil Water cooled 300 MW turbine generator;L.P. Gnedin et al;*Elektrotechnika* ,1970, pp. 6–8.*

J&P Transformer Book 11$^{th}$ Edition;A. C. Franklin et al; owned by Butterworth—Heinemann Ltd, Oxford Printed by Hartnolls Ltd in Great Britain 1983, pp. 29–67.*

Transformerboard; H.P. Moser et al; 1979, pp. 1–19.*

The Skagerrak transmission—the world's longest HVDC submarine cable link; L. Haglof et al of ASEA; ASEA Journal vol. 53, No. 1–2, 1980, pp. 3–12.*

Direct Connection of Generators to HVDC Converters: Main Characteristics and Comparative Advantages; J.Arrillaga et al; *Electra* No. 149, 08/ 1993, pp. 19–37.*

Our flexible friend article; M. Judge; *New Scientist*, May 10, 1997, pp. 44–48.*

In–Service Performance of HVDC Converter transformers and oil–cooled smoothing reactors; G.L. Desilets et al; *Electra* No. 155, Aug. 1994, pp. 7–29.*

Transformateurs a courant continu haute tension–examen des specifications; A. Lindroth et al; *Electra* No. 141, Apr. 1992, pp. 34–39.*

Development of a Termination for the 77 kV–Class High Tc Superconducting Power Cable; T. Shimonosono et al; IEEE Power Delivery, vol. 12, No. 1, Jan. 1997, pp. 33–38.*

Verification of Limited Performance in Modern Excitation Control Systems; G. K. Girgis et al; IEEE Energy Conservation, vol. 10, No. 3, Sep. 1995, pp. 538–542.*

A High Initial response Brushless Excitation system; T. L. Dillman et al; IEEE Power Generation Winter Meeting Proceedings, Jan. 31, 1971, pp. 2089–2094.*

Design, manufacturing and cold test of a superconducting coil and its cryostat for SMES applicaitons; A. Bautista et al; IEEE Applied Superconductivity, vol. 7, No. 2, Jun. 1997, pp. 853–856.*

Quench Protection and Stagnant Normal Zones in a Large Cryostable SMES; Y. Lvovsky et al; IEEE Applied Superconductivity, vol. 7, No. 2, Jun. 1997, pp. 857–860.*

Design and Construction of the 4 Tesla Background Coil for the Navy SMES Cable Test Apparatus; D.W.Scherbarth et al; IEEE Appliel Superconductivity, vol. 7, No. 2, Jun. 1997, pp. 840–843.*

High Speed Synchronous Motors Adjustable Speed Drives; ASEA Generation Pamphlet OG 135–101 E, Jan. 1985, pp 1–4.*

Billig burk motar overtonen; A. Felldin; *ERA* (TEKNIK) Aug. 1994, pp. 26–28.*

400–kV XLPE cable system passes CIGRE test; ABB Article; ABB Review Sep. 1995, pp. 38.*

FREQSYN—a new drie system for high power applications;J–A. Bergman et al; ASEA Journal 59, Apr. 1986, pp. 16–19.*

Canadians Create Conductive Concrete; J. Beaudoin et al; *Science*, vol. 276, May 23, 1997, pp. 1201.*

Fully Water–Cooled 190 MVA Generators in the Tonstad Hydroelectric Power Station; E. Ostby et al; BBC Review Aug. 1969, pp. 380–385.*

Relocatable static var compensators help control unbundled power flows; R. C. Knight et al; *Transmission & Distribution*, Dec. 1996, pp. 49–54.*

Investigation and Use of Asynchronized Machines in Power Systems*; N.I.Blotskii et al; *Elektrichestvo*, No. 12, 1–6, 1985, pp. 90–99.*

Variable–speed switched reluctance motors; P.J. Lawrenson et al; IEE proc, vol. 127, Pt.B, No. 4, Jul. 1980, pp. 253–265.*

Das Einphasenwechselstromsystem hoherer Frequenz; J.G. Heft; Elektrische Bahnen eb; Dec. 1987, pp. 388–389.

Power Transmission by Direct Current;E. Uhlmann;ISBN 3–540–07122–9 Springer–Verlag, Berlin/Heidelberg/New York; 1975, pp. 327–328.

Elektriska Maskiner; F. Gustavson; Institute for Elkreafteknilk, KTH; Stockholm, 1996, pp. 3–6—3–12.

Die Wechselstromtechnik; A. Cour' Springer Verlag, Germany; 1936, pp. 586–598.

Insulation systems for superconducting transmission cables; O. Toennesen; Nordic Insulation Symposium, Bergen, 1996, pp. 425–432.

MPTC: An economical alternative to universal power flow controllers;N. Mohan; EPE 1997, Trondheim, pp. 3.1027–3.1030.

Lexikon der Technik; Luger; Band 2, Grundlagen der Elektrotechnik und Kerntechnik, 1960, p. 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp. 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp. 1–13.

Regulating transformers in power systems– new concepts and applications; E. Wirth et al; ABB Review Apr. 1997, pp. 12– 20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp. 91–98.

Performance Characteristics of a Wide Range Induction Type Frequency Converter; G.A. Ghoneem; Ieema Journal, Sep. 1995, pp. 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp. 1–65.

Design and manufacture of a large superconducting homopolar motor; A.D. Appleton; IEEE Transactions on Magnetics, vol. 19,No. 3, Part 2, May 1983, pp. 1048–1050.

Application of high temperature superconductivy to electric motor design; J.S. Edmonds et al; IEEE Transactions on Energy Conversion Jun. 1992, No. 2 , pp. 322–329.

Power Electronics and Variable Frequency Drives; B. Bimal; IEEE industrial Electronics—Technology and Applications, 1996, pp. 356.

Properties of High Plymer Cement Mortar; M. Tamai et al; *Science & Technology in Japan*, No. 63 ; 1977, pp. 6–14.

Weatherability of Polymer–Modified Mortars after Ten–Year Outdoor Exposure in Koriyama and Sapporo; Y. Ohama et al; *Science & Technology in Japan No. 63*; 1977, pp. 26–31.

SMC Powders Open New Magnetic Applications; M. Persson (Editor); *SMC Update* , vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, pp. 1882–1888.

Low–intensy laser–triggering of rail–gaps with magnesium–aerosol switching–gases; W. Frey; 11th International Pulse Power Conference, 1997, Baltimore, USA Digest of Technical Papers, pp. 322–327.

\* cited by examiner

FIG. 1
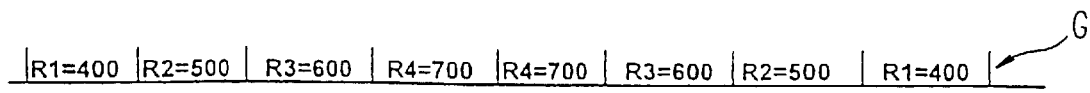
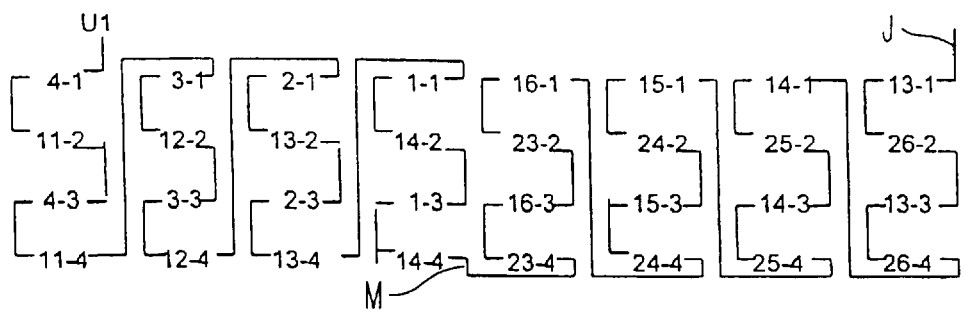
FIG. 7
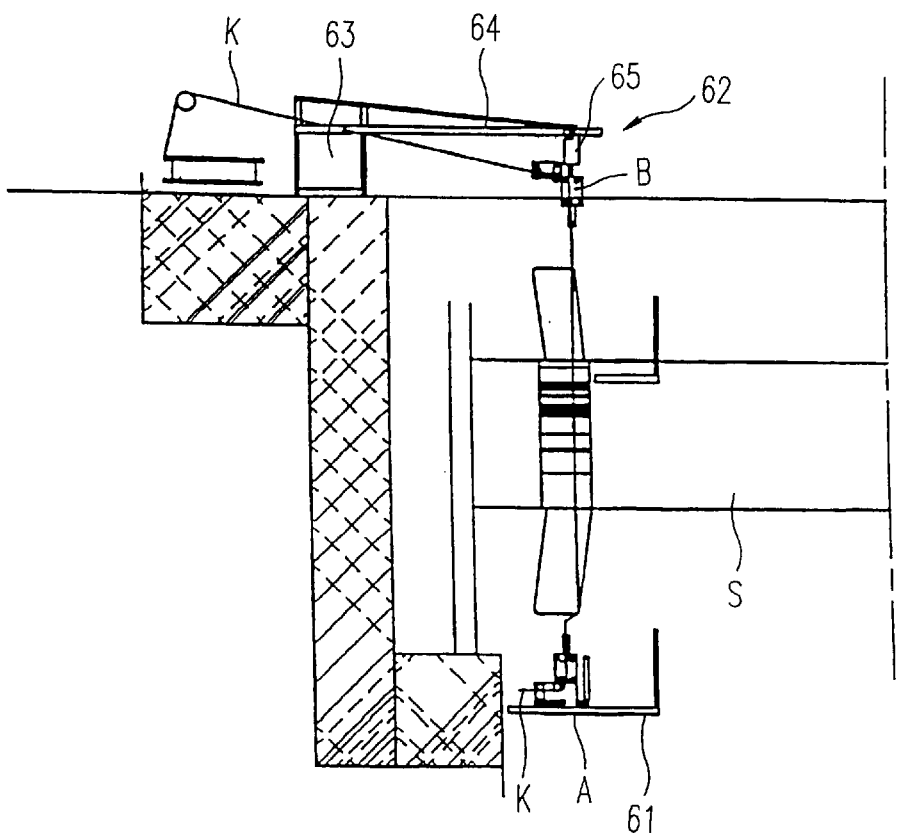

METHOD AND DEVICE FOR MOUNTING A WINDING

TECHNICAL FIELD

The present invention relates to a method and a device for mounting a winding, on a stator for a generator as specified in the preamble of claim 1 and 6, respectively.

OBJECT OF THE INVENTION

It is an object of the present invention to facilitate mounting when winding the stator. Another object of the invention is to provide a smooth and reliable laying of the conductor in the stator slots.

For these objects to be achieved, laying of the conductor should be carried out only with a "dead" conductor, i.e. No torsional twist or a minimum of torsional twist of the conductor is allowed when it is inserted in the stator slot.

A conductor which is coiled onto a drum should be uncoiled or pulled off in order for it to be free from twist. It is important that the torsional twist resulting from coiling should be maintained in order for the result to be zero, i.e. Without any remaining twist on completion of the uncoiling or pulling off. By pulling off is meant a procedure which is similar to uncoiling, i.e. Not unwinding.

The laying of the conductor should be carried out in accordance with a winding diagram, which may be specific to each generator. The stator slots are normally numbered from 1 onwards, clockwise when viewed from the upper side of the stator. Positions in the stator slots (number of "holes" for the conductor) are numbered from 1 onwards with number 1 farthest away from the axle centre of the stator frame. The conductor is laid from slot X, position A to slot Y, position B and so on. Between these positions, the conductor is laid in the form of arcs of pretermined dimensions.

Conductor stiffness and diameter vary within the same generator depending on different voltage levels.

The outer semiconductive layer of the conductor might be soft and must not be damaged and the bending radius of the conductor must not fall below the minimum permissible.

SUMMARY OF THE INVENTION

The above described objects are achieved by the method according to the present invention, which is characterized by the following steps:

a) using cable for the winding, the winding being wound with a number of cables (K) of predetermined lengths for the intended winding of the stator, b) placing the centre of the cable, i.e. the location at half the predetermined length, at the location of the stator slot representing the middle of an intended coil arc, c) starting from the said centre of the coil arc, winding the first half cable length onto the stator in order to form a first coil arc half and part of the total stator winding, and d) winding the remaining half cable length onto the stator, starting from the said centre of the coil arc and in the opposite direction to the winding of the first half cable length in order to form the other half of the coil arc on the stator and another part of the total stator winding.

The method may be realized by means of a device according to the present invention, said device being characterized by being arranged to be used for winding with cable comprising a number of cables (K) of predetermined lengths for the stator winding, which device comprises a drum means arranged to initially support the entire predetermined cable length, a first and a second cable feeder adjustable relative to the stator slots, which cable feeders are arranged to alternately lay the cable in successive stator slots in accordance with a predetermined winding diagram by means of intermediate storage means, so that first mounting of the first half of the said predetermined cable length is to be carried out starting from the stator slot representing the middle of an intended coil arc, and when winding of the first winding portion is completed, mounting of the second winding portion is to be carried out starting also from said stator slot.

The method implies that first one cable half is mounted, i.e. half the cable length is advanced through the stator slots and laid therein and thereafter the second half of the cable is advanced and laid. In particular the invented method and device are advantageous when used in connection with an rotating electric machine of the type as disclosed in WO-97/45919.

A cable intended for winding a stator according to the invention may be delivered wound onto a delivery drum. The method according to the present invention may in that case preferably be realized as follows: Unwinding a predetermined length from the delivery drum and coiling it onto a drum means. The cable is cut off when a predetermined length has been coiled onto the drum means. In connection with the coiling, a distinct marking is made at the cable centre, i.e. at half the predetermined cable length. The procedure continues in that a first half of the cable is once more uncoiled from the drum means so as to be mounted in the winding slots of the stator and is thereafter coiled onto an intermediate storage means, the centre marking of the cable being located such that the mark represents the middle of an intended coil arc. The cable is taken from the intermediate storage means, is mounted in winding slots and the rest of the cable is coiled onto the intermediate storage means. This continues until half the cable is mounted. The other cable half is still on the drum means. In the further procedure, the other cable half is uncoiled from the drum means so as to be mounted in the winding slots of the stator and then coiled onto the intermediate storage means. The cable is taken from the intermediate storage means, is mounted in the winding slots and the rest of the cable is coiled onto the intermediate storage means. This continues until the other half of the cable is also mounted.

The intermediate storage means may be formed of two separate capstans, which are used alternately when mounting the cable half in the stator slots, or the intermediate storage means may be formed of a dual drum capstan, the two drums of which are used alternately when mounting the cable half in the stator slots.

The drum means may be formed of a separate capstan machine or it may be formed as an additional drum, the coiling of which is arranged to take place by means of the intermediate storage means, which drum, however, during uncoiling is arranged separately from the intermediate storage means.

The laying of the cable may be carried out in accordance with two main principles: Pushing the cable into the stator slots using a cable feeder in accordance with Method 1 as described below or pulling the cable trough the slots using a pull wire in accordance with Method 2 as described below.

Method 1

The cable is disconnected from the first capstan and is pulled out over the drum edge thereof. For heavy cable, the pulling out may be carried out using a telpher or other facility. A cable guide is mounted on the free end of the cable. The cable guide consists of a cylindrical rod the diameter of which is somewhat smaller than that of the stator slot concerned and its length is about five times its diameter. The cable with cable guide is inserted in a first cable feeder which is located at one side of the stator frame (the upper side). The cable is run by means of the first cable feeder through the stator slot and out thereof on the other side of the stator frame (the under side), where the cable with cable guide, when a sufficient cable length has been advanced, is inserted in a second cable feeder, which is disposed at the other side of the stator frame and is directed towards a successive stator slot in accordance with a predetermined winding diagram, so that by means of this second cable feeder the cable is run through said successive stator slot and out thereof on the said one side of the stator frame (the upper side). Here the first cable feeder, which has been directed towards yet another stator slot in accordance with the said diagram, now takes over the cable with cable guide for further transport. It may be necessary to temporarily stop one cable feeder while the other cable feeder advances the cable in a stator slot. The cable feeders are thus driven alternately or simultaneously until the centre marking of the cable gets into a position just opposite the stator slot representing the middle of the coil arc (towards which the first cable feeder was directed at the start).

To achieve the required arc dimension, the cable feeder which has pushed the cable into a stator slot is disconnected and moved. Instead, the cable feeder on the opposite side of the stator frame is connected, which will pull the cable until the required arc dimension is reached.

The work proceeds in accordance with the above mentioned principle, i.e. insertion in one stator slot and return feed in another in accordance with the winding diagram. The free cable end is fed into the intermediate storage means on the capstan or drum which is empty at the time, every other time the first capstan or drum and every other time the other capstan or drum. The arc portions are adjusted continuously by means of the cable feeders.

When the first half of the cable is mounted, the procedure is repeated with the second half of the cable.

The method and the device are special, however, are not exclusively intended to be applied when mounting high-voltage cable on a generator where high-voltage cable is used in the windings of the stator, which cable lacks the outer protective covering normally surrounding it.

The cable is preferably of the kind consisting of an inner core with a plurality of wires, an inner semiconductive layer surrounding the core, an insulating layer surrounding the inner semiconductive layer, and an outer semiconductive layer surrounding the insulating layer, preferably with a diameter of about 20 to 200 mm and a conductor area ranging from 80 to 3000 mm$^2$.

Method 2

The cable is disconnected from the first capstan and is pulled out over the drum edge thereof. For a heavy cable, the pulling out may take place by means of a telpher or other facility. A pull wire is mounted to the free end of the cable.

The pull wire suitably consists of a flexible fibre glass rod having a smaller diameter than that of the cable. At one end of the pull wire, a sleeve with attachment for connection of the cable is provided.

The pull wire is inserted manually into the stator slot from one side of the stator frame (the upper side) and is taken out thereof on the opposite side (the under side). The pull wire is thereafter inserted in a first cable feeder disposed at the said opposite side of the stator frame. The pull wire with cable is pulled through the stator slot and when a sufficient length has been advanced, the pull wire is inserted in the next stator slot according to the winding diagram. When a sufficient length of the pull wire has been advanced from the said next stator slot at one side of the stator frame (the upper side) it is inserted in another cable feeder disposed there for pulling the cable through the stator slot.

Similarly as in Method 1 it may be necessary to temporarily stop one cable feeder while the other cable feeder pulls the cable in a stator slot. The cable feeders are thus driven alternately or simultaneously until the centre marking of the cable is at a location opposite the stator slot representing the middle of the coil arc (towards which the first cable feeder was directed at the start).

In order to achieve the required arc dimension, the cable feeder that has pulled the cable into a stator slot is disconnected and moved. Instead, the cable feeder on the opposite side of the stator frame is connected, which will pull the cable until the required arc dimension is reached.

The work proceeds in accordance with the above mentioned principle, i.e. pulling through one stator slot and return feed through another in accordance with the winding diagram. The free cable end is fed into the intermediate storage means on the capstan or drum which is empty at the time, every other time the first capstan or drum and every other time the other capstan or drum. The arc portions are continuously adjusted by means of the cable feeders.

When the first half of the cable is mounted, the procedure is repeated with the other cable half.

BRIEF DESCRIPTION OF THE DRAWINGS

The method of the present invention will now be described in more detail by means of preferred embodiments of the device according to the invention with reference to the appended drawings, in which FIG. 1 shows an example of part of a winding diagram for a stator of a generator, FIG. 7 illustrates a preferred embodiment of mobile equipment for the cable feeders included in the device.

DESCRIPTION OF PREFERRED EMBODIMENTS

The mounting of windings on the stator for a generator is carried out in accordance with a winding diagram, which may be specific to each generator. In FIG. 1 there is shown an example of such a winding diagram for the stator winding, which forms the basis of the method according to an embodiment of the present invention. In the winding diagram, the stator slots are numbered from 1 to 26 and the positions are numbered from -1 to -4.

The cable, which thus is to form part of the stator winding, is mounted starting from the point representing the centre of an intended coil arc, which thus corresponds to the middle of the predetermined length of the cable. In FIG. 1 said centre is marked by an M. One cable half is thus mounted starting in the stator slot 14-4 and is run to the left in the figure so as to be terminated by the stator slot 4-1. The other cable half is mounted starting in the stator slot 23-4 and is run to the right in the figure to be terminated by the stator slot 13-1.

Figure 2:
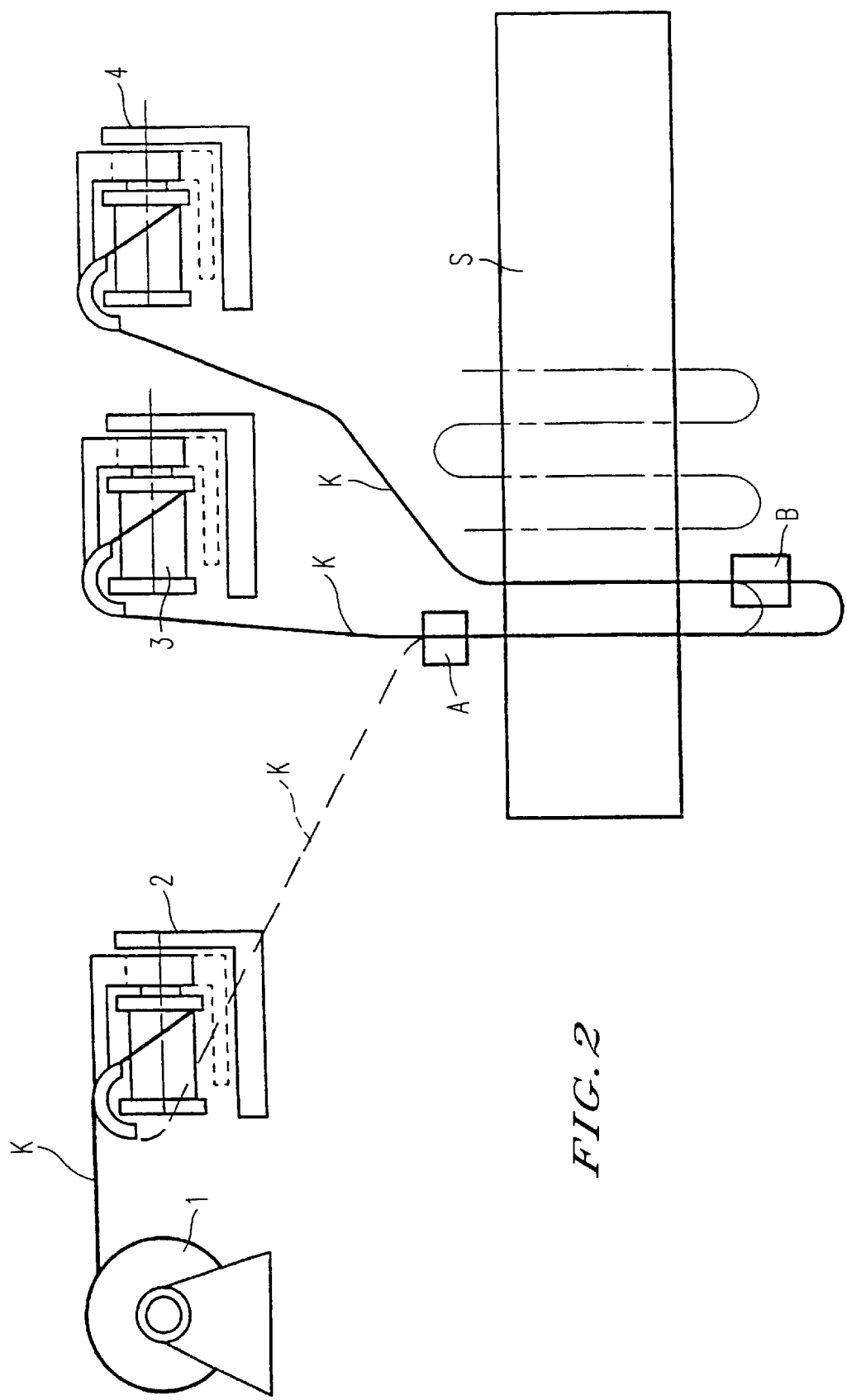
FIG. 2 is a principal diagram of the method of mounting cables according to the present invention using two capstans as intermediate storage means.

FIG. 2 shows a principle diagram of the method of cable mounting according to the present invention when the cable K to be mounted is delivered wound onto a delivery drum 1 and using two capstans as intermediate storage means. A predetermined length of the cable K is unwound from the the delivery drum 1, which is coiled onto a drum means, here in the form of a capstan machine 2. During the coiling in the capstan machine 2, a marking is made at the centre of the cable K, i.e. at the point of half the predetermined length, and the cable K is cut off on reaching the full predetermined length.

The actual mounting on the stator S thereafter starts by the free end of the cable K on the capstan machine 2 being led to a first cable feeder A (dashed line in FIG. 2) for laying of the cable in a first stator slot. On leaving said stator slot on the opposite side of the stator frame S, the end of the cable K is gripped by a second cable feeder B, which inserts the cable K in the next stator slot according to the winding diagram. On reaching the end of said stator slot, the cable K is caused to run to a first intermediate storage means formed as a capstan 4. In the capstan 4 such an amount of the cable K is stored that the centre marking thereof will be located just opposite the first stator slot (M in FIG. 1). The cable feeder A is then moved to the following stator slot according to the winding diagram and the free end of the cable half, which is on the capstan 4, will be returned to-the cable feeder A. The cable feeder A inserts the free cable end in the said following stator slot, whereupon the cable end on leaving said stator slot on the opposite side of the stator frame S is again gripped by the cable feeder B, which has now been directed towards the succeeding stator slot according to the winding diagram and inserts the cable therein. On reaching the end of said stator slot, the cable is caused to run to a second intermediate storage means 3, also formed as a capstan. Said other capstan 3 will store such a length of the first cable half that the capstan 4 is emptied. The cable feeder A is then moved to the next stator slot according to the winding diagram in order to lay the cable now coming from the capstan 3 therein.

The procedure is thereafter repeated using the cable feeders A and B, the cable K being taken alternately from the capstan 4 and the capstan 3. When the first cable half is mounted in the slot of the stator frame S according to the winding diagram, the same procedure is carried out with the other cable half, which until now has remained on the capstan machine 2.

Figure 3:
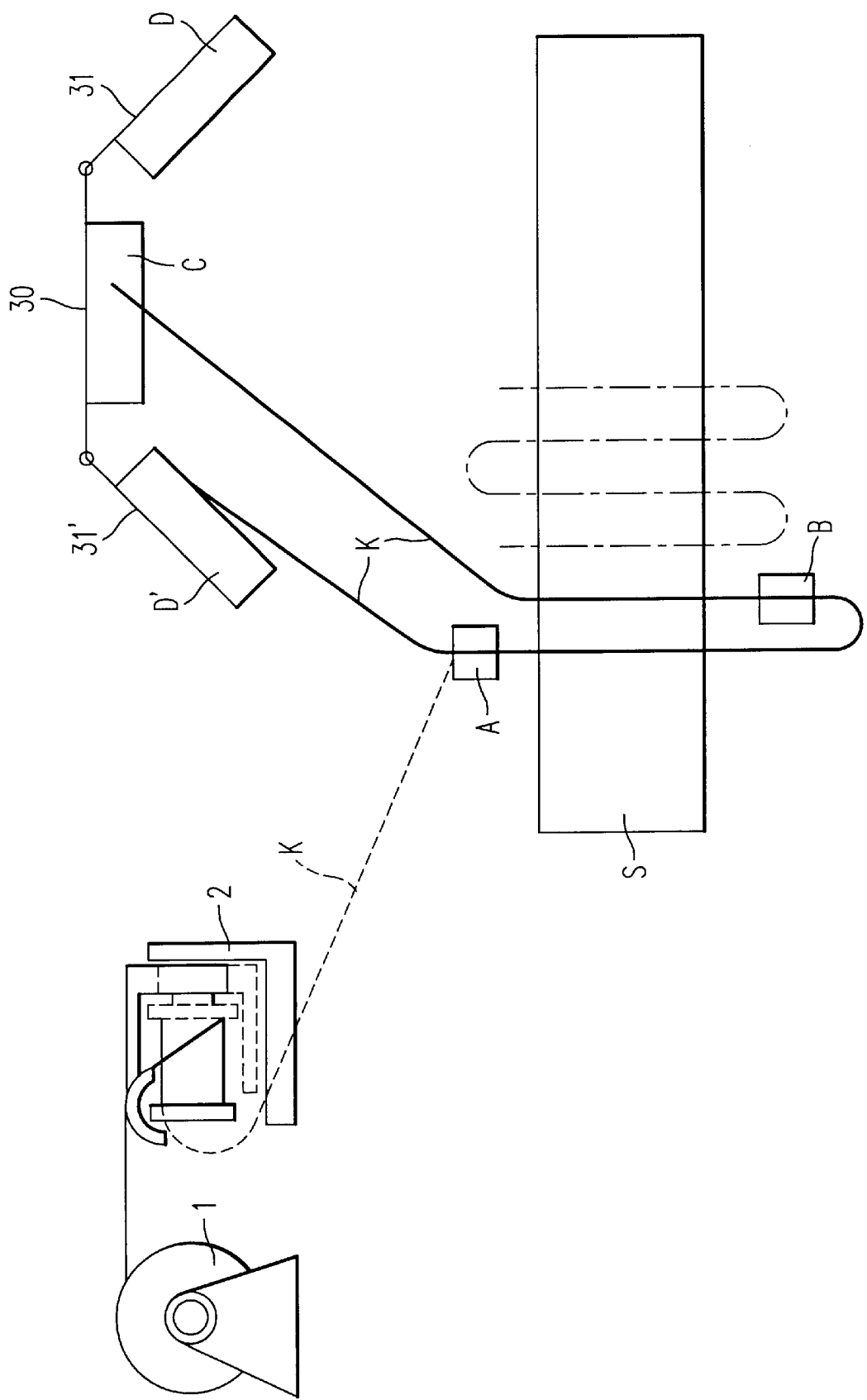
FIG. 3 is a principle diagram of cable mounting according to the present invention corresponding to FIG. 2 using a dual drum capstan as intermediate storage means.

In FIG. 3 there is shown a principle diagram of the method similar to the one shown in FIG. 2., however with the difference that here a dual drum capstan 30 is employed as an intermediate storage means. Like in the embodiment according to FIG. 2 when the cable K to be mounted is delivered wound onto a delivery drum 1, a predetermined length of the cable K is uncoiled from the delivery drum 1, which length is coiled onto a drum means, in this case too illustrated as a capstan machine 2. During the coiling in the capstan machine 2, a marking is made at the centre of the cable K, i.e. at the point of half the predetermined length, and the cable is K is cut off on reaching the full predetermined length.

In this embodiment too, the actual mounting on the stator S Thereafter starts by leading the free end of the cable K on the capstan machine to a first cable feeder A (dashed line in FIG. 3) for laying of the cable in a first stator slot. When the cable K leaves this stator slot on the opposite side of the stator frame S the end thereof is gripped by another cable feeder B, which inserts the cable K in the next stator slot according to the winding diagram. On reaching the end of this stator slot, the cable K is caused to run to the intermediate storage means 30, here formed by the dual drum capstan, which has two drum swinging arms 31 and 31'.

The cable K is received on a drum which is in a coiling position C of the dual drum capstan 30. On this drum such an amount of the cable K is stored that its centre marking will be located just opposite the first stator slot (M in FIG. 1). The cable feeder A is then moved to the following stator slot according to the winding diagram while the swinging arm 31 brings the coiled drum to an uncoiling position D. The free end of the cable half then present on the coiled drum in the D position is again transferred to the cable feeder A. The cable feeder A inserts the free cable end in said following stator slot, the cable end when leaving this stator slot on the opposite side of the stator frame S again being gripped by the cable feeder B, which has now been directed towards the successive stator slot according to the winding diagram and inserts the cable therein. On reaching the end of said stator slot, the cable is caused to run to the coiling position C in the dual drum capstan 30, whereto its other drum swinging arm 31' has now brought an empty drum. This empty, other drum then stores such an amount of the first cable half that the first drum in the uncoiling position D is emptied. The cable feeder A is then moved to the next stator slot according to the winding diagram while the other drum is moved from the coiling position C to the uncoiling position D' by the drum swinging arm 31'. The cable now coming from the drum in the uncoiling position D' is inserted by the cable feeder A in the new slot. The drum swinging arm 31 of the dual drum capstan 30 returns the empty drum from the position D to the coiling position C in readiness for another coiling operation.

The procedure is then repeated by the cable feeders A and B, the cable K being taken from the dual drum capstan 30 alternately from its uncoiling position D and uncoiling position D'. When the first cable half has been mounted in the slots of the stator frame S in accordance with the winding diagram, the same procedure is carried out with the other cable half, which until then has remained on the capstan machine 2.

In the embodiments of the method according to the invention described above with reference to FIGS. 2 and 3, a capstan machine 2 has been employed as a drum means for coiling the predetermined cable length K from the delivery drum 1. IT is, however, conceivable to use as a drum means an additional drum, the coiling of which is handled by means of the intermediate storage means, for instance by the dual drum capstan 30. During uncoiling of the cable K, the additional drum is, however, separated from the intermediate storage means and is located in the position taken by the capstan machine 2 in FIGS. 2 and 3.

Figure 4:
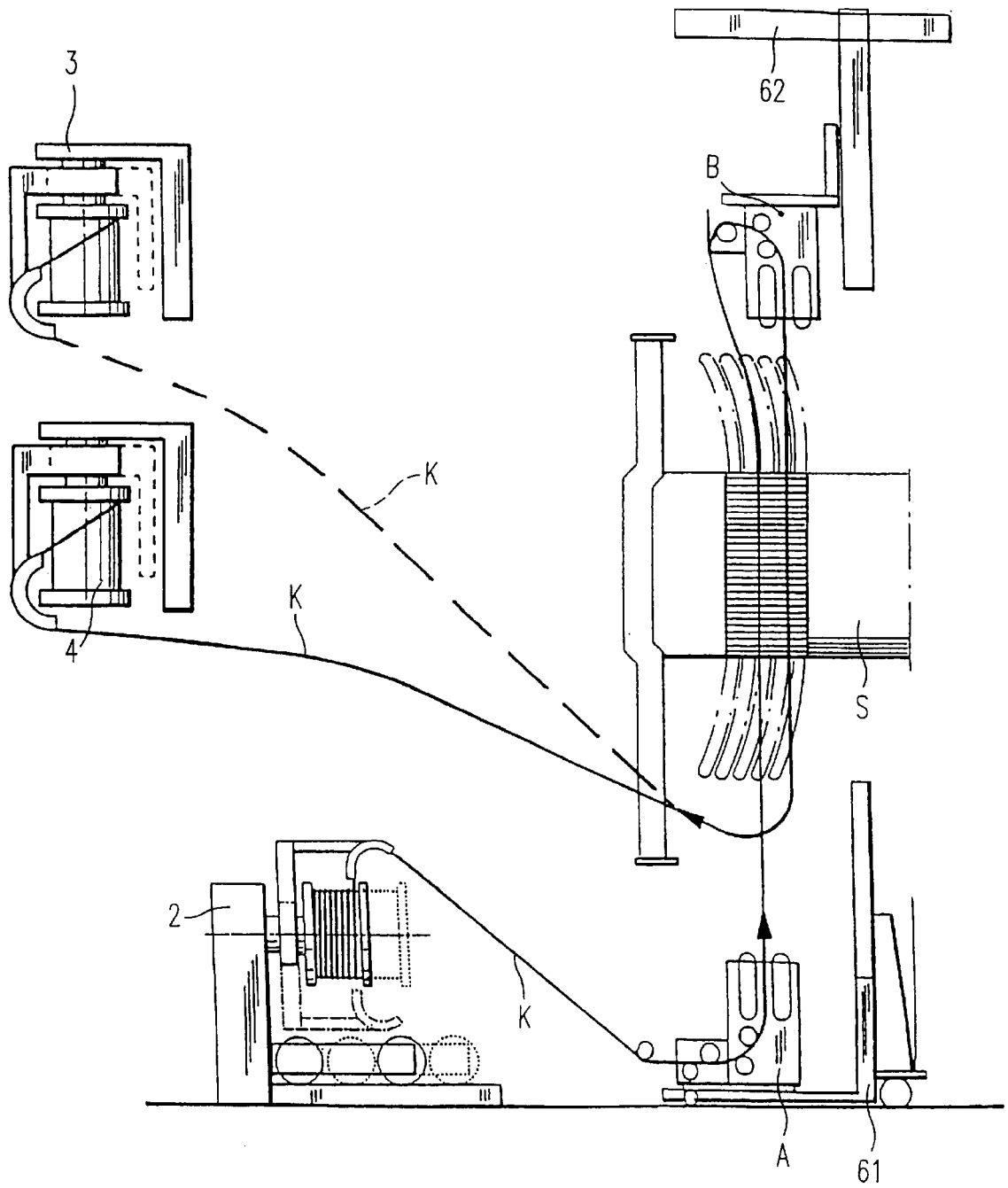
FIGS. 4 and 5 show alternative embodiments of the invention with two capstans and a dual drum capstan respectively.
Figure 5:
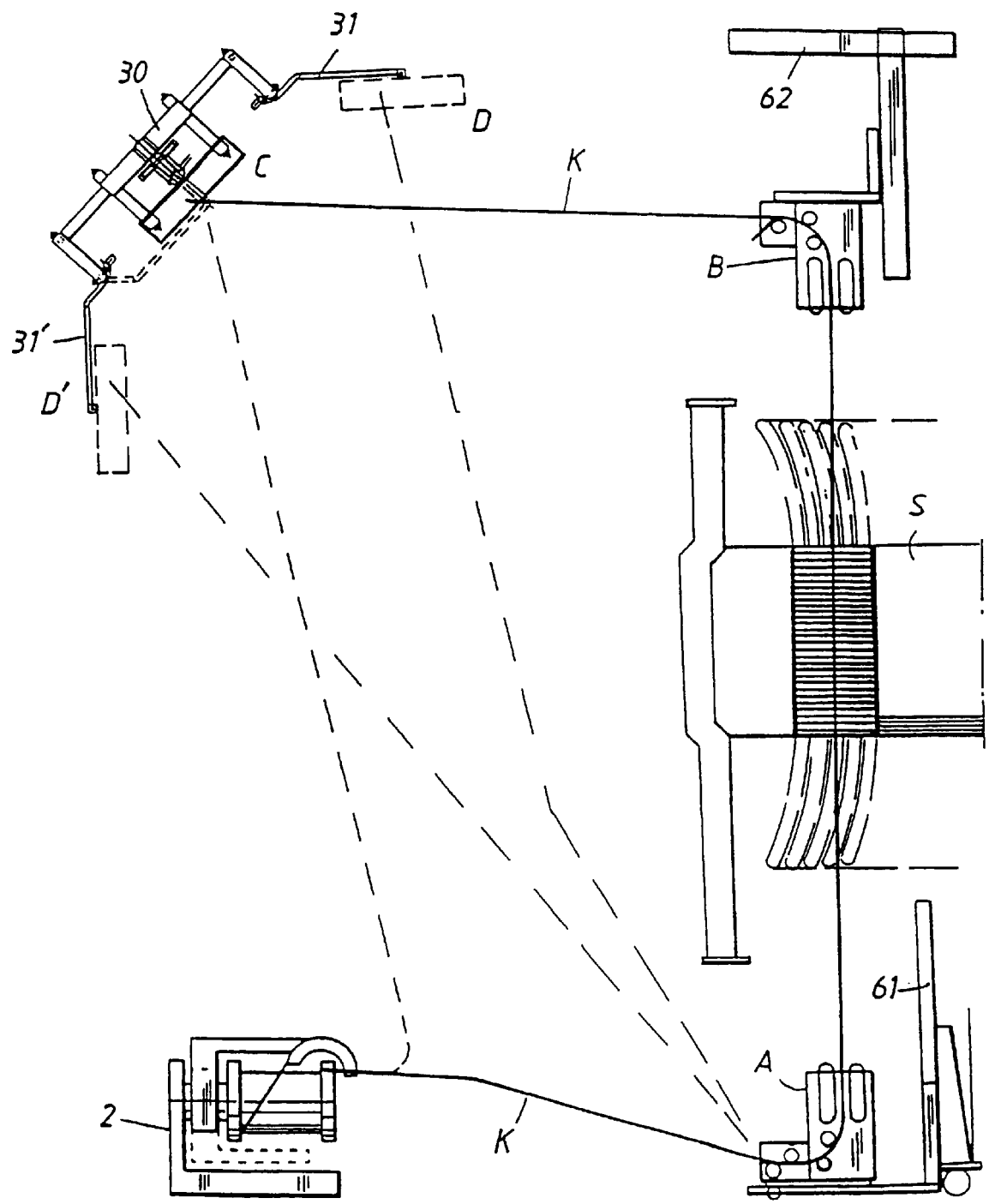

FIGS. 4 and 5 are diagrammatic views of the device, on one hand using two capstans 3, 4 as intermediate storage means, on the other hand using a dual drum capstan 30 as an intermediate storage means in order to realize the above stated method of the invention. These preferred embodiments of the device will now be described in conjunction with the mounting of the cable K on a stator frame S for a 35 kV generator with stepped lap winding in accordance with the arc dimensions G given in FIG. 1 for the various stator slots. The total height of the coil arcs is measured from the laminate plate of the stator frame S to the upper edge of the cable K. The cable dimensions used are between 20 and 60 mm. The predetermined cable length initially present on the capstan machine 2 may amount to around 150 meters.

Mounting begins with inserting the free end of the cable K in the stator slot 14-4 just opposite the starting point C according to FIG. 1. By the term "stator slot 14-4" is meant the stator slot 14, position 4, in accordance with what has been explained with reference to FIG. 1 above. The starting point M also coincides with the centre of the cable K and the centre of the intended coil arc. The first cable half is mounted by following the winding diagram backwards, i.e. to the left in FIG. 1, from the stator slot 14-4 to the stator slot 4-1. The second cable half is mounted correspondingly by following the winding diagram to the right according to FIG. 1, i.e. from the stator slot 23-4 to the stator slot 13-1. The winding diagram shown refers to part of the total stator winding with a number of coil arcs.

Mounting is carried out by pulling one free cable end manually from the drum in the capstan machine 2 to the cable feeder A, which is directed towards the stator slot 14-1 and runs the cable K through the stator slot to the opposite side of the stator frame S. The cable feeder A is stopped when around 4 meters of cable has been fed from the stator slot on this side. The cable end is then gripped by the cable feeder B, which directs the cable end towards the slot 1-3 and runs the cable K through the stator slot while the cable feeder A is activated. The cable end is directed towards the intermediate storage means (4 in FIG. 4; C in FIG. 5). At the cable feeder B the cable K should be bent into an arc of a total height of 700 mm according to the arc dimension G of the winding diagram and measured to the upper side of the cable.

The cable feeder A is moved to the stator slot 14-2 and the cable K is pulled manually from the intermediate storage means (4 in FIG. 4; D' in FIG. 5) to the cable feeder A to be run through said stator slot to the opposite side of the stator frame. The cable feeder A is stopped when around 4 meters of cable has been fed from the stator slot. The cable K is gripped by the cable feeder B and is directed towards the stator slot 1-1 and is run therethrough. The cable feeder A is activated at the same time and the cable is directed towards the intermediate storage means (3 in FIG. 4; D in FIG. 5), into which the major part of the cable half is run.

At the cable feeder A the cable K should be bent into an arc of a total height of 700 mm according to the arc dimension G of the winding diagram and measured to the under side of the cable.

The procedure is repeated up to and including the stator slot 4-1.

There should now remain a sufficient length of the cable half for connection to the connection terminal U1 of the generator.

Then the free end of the other cable half is pulled from the drum of the capstan machine 2 to the cable feeder A, which is then directed towards the stator slot 23-4. The procedure is then repeated as above, but this time forwards according to the winding diagram, up to and including the stator slot 13-1. At the last stator slot 13-1, the cable should be connected with the next cable, which is to form a successive winding portion J.

The procedure is repeated according to the complete diagram (not shown) for all 36 kV cables, whereafter the same procedure is applied for the 24 kV and 12 kV cables included in the intended generator stator.

Figure 6:
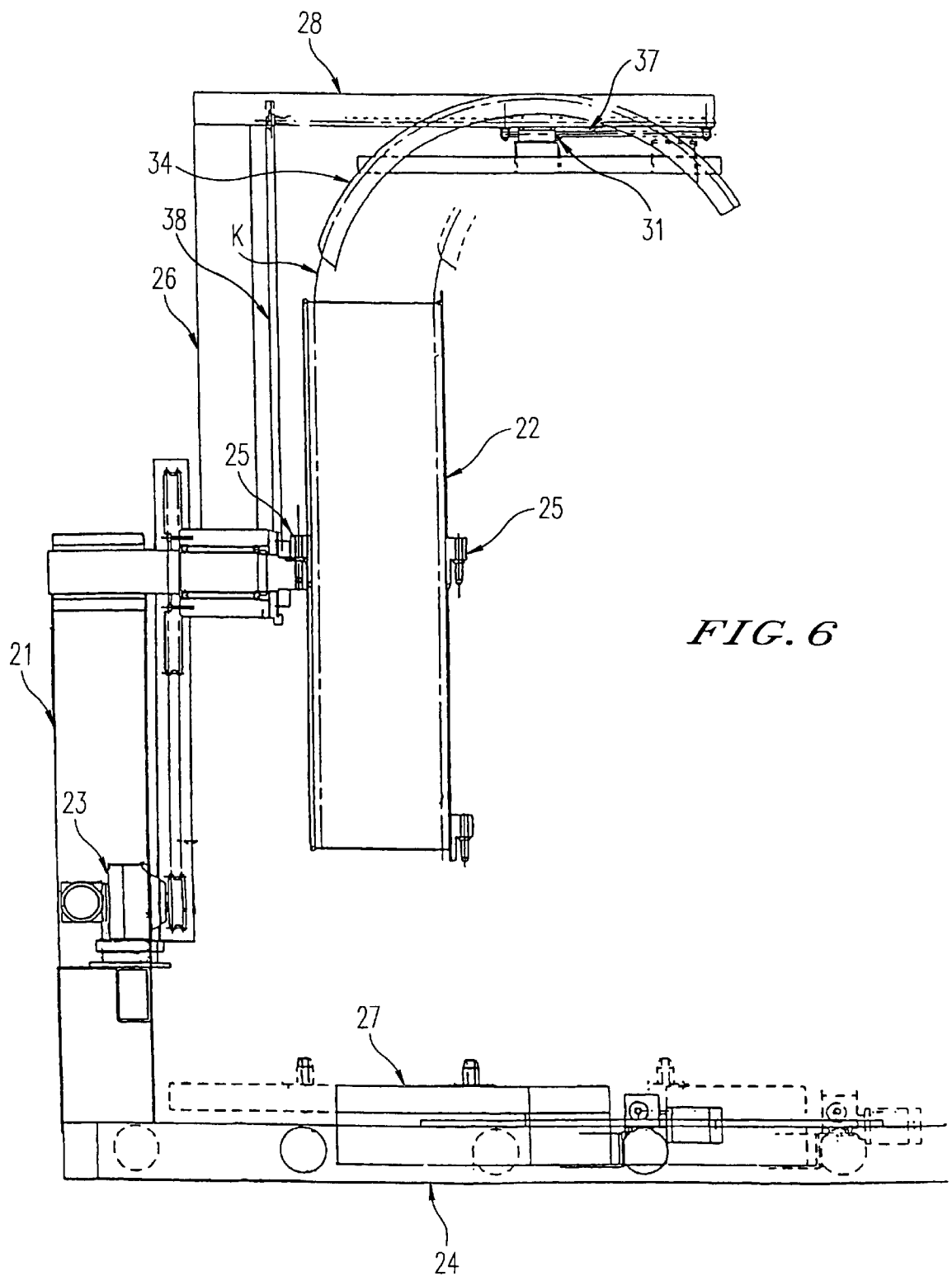
FIG. 6 illustrates a preferred embodiment of the capstan machine included in the device according to FIG. 3.

In the mounting arrangement according to FIGS. 2 and 4 a capstan machine 2 is used, the preferred embodiment of which is shown in more detail in FIG. 6.

The capstan machine 2 comprises a support 21 with a horizontally mounted drum 22, driving equipment 23 for driving a spreader arm 26, a carriage 24 with a lifting and rotating table 27 for rotating the drum 22 180° in the horizontal, a coupling 25 for changing sides of holding of the drum 22 and a boom 28 associated with the spreader arm 26 for coiling and uncoiling of the cable K from the drum 22.

The spreader arm 26 of the capstan machine, in the preferred embodiment, is rotatably mounted on the support 21 and supports a gripping arm 34 for coiling and uncoiling the cable K on the stationary drum 22. Rotation of the gripping arm 34 is caused by means of a belt or chain 38 secured to the support 21, which belt or chain drives a screw device 37 via a screw. The gripping arm 34 is suitably shaped like a curved V-profile having a running track arranged for the cable K which running track is oriented towards the drum 22. The carriage 24 is disposed under the drum 22 and its lifting and rotating table makes possible the said rotating of 180° of the drum 22 by lifting the drum 22 so that the coupling 25 of the drum is disconnected from the support 21, whereafter rotating is carried out and the drum 22 is lowered so that the coupling 25 on the opposite side of the drum is connected with the support 21.

The capstan machine is intended for the rewinding of cables, hoses or the like from large delivery drums (1 according to FIG. 2) to the drum 22, the size of which may be adapted to the immediate requirements. Specific to the capstan machine 2 is that the coiled cable K may be mounted/used from both ends without the cable having to be cut off.

The cable K from the delivery drum is attached to the drum 22 of the capstan machine 2. During the coiling, the cable K is measured so that the predetermined length of cable is coiled before the cable K is cut off. During preparation for mounting in accordance with the method of the present invention, a predetermined length of the cable K is thus coiled from the delivery drum 1 to the coiling drum 22. When mounting on a stator frame S one free cable end is fed to the cable feeler A, as described above with reference to FIGS. 2 and 4, the cable then being used successively. When half the predetermined length of the cable is used, the coiling drum 22 is rotated 180° and the other free end of the cable is transferred to the cable feeder A for continued mounting.

The capstan machine 2 as well as the embodiment of the intermediate storage means 3 and 4 formed as a coiling device are subject to a copending separate patent application 9700366-9 entitled "Coiling device".

The intermediate storage means 30 in the form of a dual drum capstan is subject to a copending separate patent application 9700370-1 entitled "Dual drum capstan".

With the intermediate storage means formed as a dual drum capstan 30, the capstan machine 2 shown in FIG. 6 may be simplified in that the carriage 24 with the lifting and rotating table 27 can be excluded. The required rotating of the drum 22 180° is carried out by each of the drum swinging arms 31, 31' of the dual drum capstan, during the travel between the positions C and D or D'.

In the method according to the present invention, it is to advantage to arrange the cable feeders A and B as mobile devices. As indicated in FIGS. 4 and 5, the cable feeder A may be disposed on a fork lift truck 61 which is movable on a recessed floor surface under the stator frame S in the stator slots of which the cable K is to be mounted. The cable feeder B may then be suspended in a traverse or telpher above the stator frame S. This traverse or telpher device 62 is depicted also in FIG. 7, from which may be seen that the equipment comprises a mobile work platform 63 with a crane jib 64 and a telpher 65 running therealong. The crane jib 64 is directed radially inwards towards the centre of the stator frame S and the telpher 65 supports the cable feeder B. To advantage, the work platform 63 runs on a floor-mounted rail track.

A cable feeder of suitable construction is subject to a copending separate patent application 9700365-1 entitled "Feeding device".

While the method according to the present invention has been described above in conjunction with preferred embodiments of a device for carrying out the method, it will be understood that said carrying out may be achieved also by means of other devices without departing from the principle of the invention as defined in the appended claims.

What is claimed is:

1. A method of mounting a winding on a stator for a generator comprising the steps:
    a) using cable for the winding, the winding being wound with a number of cables of predetermined lengths for the intended winding of the stator,
    b) placing the ,enter of the cable of about half the predetermined length at a location in a slot of the stator representing the middle of the intended coil arc,
    c) starting from the center of the coil arc, winding the first half cable length onto the stator to form a first coil arc half and part of a complete stator winding turn, and
    d) winding the remaining half cable length onto the stator starting from the said center of the coil arc and in the opposite direction relative to the winding of the first half cable length so as to form the other half of the coil arc on the stator and another part of the complete stator winding, wherein the cable is a high voltage cable.

2. A method of mounting a winding on a stator for a generator comprising the steps:
    a) using cable for the winding, the winding being wound with a number of cables of predetermined lengths for the intended winding of the stator,
    b) placing the center of the cable of about half the predetermined length at a location in a slot of the stator representing the middle of the intended coil arc,
    c) starting from the center of the coil arc, winding the first half cable length onto the stator to form a first coil arc half and part of a complete stator winding turn,
    d) winding the remaining half cable length onto the stator starting from the said center of the coil arc and in the opposite direction relative to the winding of the first half cable length so as to form the other half of the coil arc on the stator and another part of the complete stator winding where the cable is delivered wound onto a delivery drum,
        unwinding the cable from the delivery drum a predetermined length, and coiling the cable onto a drum means,
        marking the center of the cable at half the predetermined length, and cutting the cable at the predetermined length,
        carrying out step a) and b), the first half cable length up to the center being uncoiled from the drum means using intermediate storage means, and
        carrying out step c), the remaining half cable length being uncoiled from the drum means using said intermediate storage means.

3. A method of mounting a winding on a stator for a generator comprising the steps:
    a) using cable for the winding, the winding being wound with a number of cables of predetermined lengths for the intended winding of the stator,
    b) placing the center of the cable of about half the predetermined length at a location in a slot of the stator representing the middle of the intended coil arc,
    c) starting from the center of the coil arc, winding the first half cable length onto the stator to form a first coil arc half and part of a complete stator winding turn,
    d) winding the remaining half cable length onto the stator starting from the said center of the coil arc and in the opposite direction relative to the winding of the first half cable length so as to form the other half of the coil arc on the stator and another part of the complete stator winding
        A) mounting a cable guide on one free end of the cable,
        B) inserting the one free end of the cable in a first cable feeder located at the upper side of the stator frame and at the stator slot representing the middle of the intended coil arc,
        C) running the one free end of the cable with the cable guide through the stator slot, which extends between the first cable feeder and the under side of the stator frame,
        D) inserting the one free end of the cable with the cable guide in a second cable feeder disposed at the under side of the stator frame and running it through a following stator slot according to a predetermined winding diagram,
        E) thereafter running the free end of the cable with the cable guide alternatively by means of the first cable feeder and the second cable feeder through the stator slots according to the winding diagram until the cable center marking is just opposite the stator slot representing the middle of the intended coil arc, and
        F) thereafter repeating steps A)–E) for the other free end of the cable.

4. A method according to claim 3 comprising the step of disconnecting the cable feeder to provide the required arc dimension connecting the cable feeder on the opposite side of the stator frame to provide the required arc dimension.

5. A method of mounting a winding on a stator for a generator comprising the steps:
    a) using cable for the winding, the winding being wound with a number of cables of predetermined lengths for the intended winding of the stator,
    b) placing the center of the cable of about half the predetermined length at a location in a slot of the stator representing the middle of the intended coil arc,
    c) starting from the center of the coil arc, winding the first half cable length onto the stator to form a first coil arc half and part of a complete stator winding turn,
    d) winding the remaining half cable length onto the stator starting from the said center of the coil arc and in the opposite direction relative to the winding of the first half cable length so as to form the other half of the coil arc on the stator and another part of the complete stator winding
        A1) mounting a pull wire to one free end of the cable,
        B1) inserting the pullwire at one side of the stator frame in the stator slot representing the middle of the intended coil arc, so as to emerge from the stator slot at the other, opposite side of the stator frame,
        C1) inserting the pull wire in a first cable feeder provided at the other, opposite side of the stator frame,
        D1) thereafter pulling the pull wire with the cable through the stator slot and inserting it in a following stator slot according to the predetermined winding diagram, D2) when a sufficient length of the pull wire is fed from the following stator slot at one side of the stator frame, inserting it in a second cable feeder provided at the said one side of the stator frame and pulling the cable up therethrough to be taken over by the first cable feeder, which is directed towards the following stator slot according to the winding diagram, E1) running the cable feeders alternately for pulling the cable into the stator slots according to the winding diagram until the center marking of the cable is just opposite the stator slot representing the middle of the intended coil arc, and F1) thereafter repeating steps A1)–E1) for the other half of the cable.

6. A device for mounting a winding in slots of a stator for a generator, wherein the device is arranged to be used for winding with cable formed of a number of predetermined lengths of cable for the stator winding, comprising: drum means arranged to initially support the entire predetermined length of a cable, a first and a second cable feeder adjustable relative to the stator slots, which cable feeders are arranged to alternately lay the cable in successive stator slots according to a predetermined winding diagram by means of intermediate storage means, so that first mounting of a first half of the said predetermined cable length is to be carried out starting from the stator slot representing the middle of an intended coil arc and when winding of a first winding portion is completed, mounting of the other winding portion is to be carried out starting also from said stator slot.

7. A device according to claim 6, wherein one free end of the cable is feedable from the drum means to the first cable feeder in order to be inserted, on one side of the stator frame, in the stator slot representing the middle of an intended coil arc, the other cable feeder being disposed at the other, opposite side of the stator frame to grip the cable end emerging from the stator slot and to insert the cable end in the following stator slot according to the winding diagram and advance the cable therethrough for intermediate storage in the intermediate storage means, arranged to store the portion advanced of half the predetermined length of the cable when the center of the cable is just opposite the stator slot representing the middle of the intended coil arc, the first cable feeder being re-directed towards the next stator slot according to the winding diagram in order to insert therein the free cable end taken from the intermediate storage means which on the opposite side of the stator frame is arranged to be gripped by the other cable feeder so as to be inserted thereby in a following stator slot according to the winding diagram and to advance the cable therethrough for intermediate storage in the intermediate storage means, arranged to store the other of half the predetermined length of the cable, whereafter the first cable feeder is directed towards another following stator slot according to the winding diagram to insert therein the free cable end again taken from the intermediate storage means and to repeat the mounting of one half of the stator with half the predetermined cable length, whereafter the same procedure is arranged to be carried out with the other half cable length remaining on the drum means.

8. A device according to claim 6, wherein the drum means is formed as a capstan machine, which comprises a support with a drum for storage of the cable on unwinding from a delivery drum and for feeding out the wound cable by using both ends of the cable without the cable being cut off.

9. A device according to claim 8, wherein support includes driving equipment for driving a spreader arm and means for rotating the drum 180° in a horizontal direction, the drum having a coupling on at least one opposite side thereof for being held alternately on the support.

10. A device according to claim 9, wherein the means for rotating the drum comprises a carriage disposed under the drum and including a lifting and rotating table for lifting the drum for rotation, so that the coupling of the drum is disconnected from the support, whereafter rotation takes place and the drum is lowered, so that the coupling on the opposite side of the drum is connected to the support.

11. A device according to claim 8, including a boom associated with the spreader arm for coiling and uncoiling of the cable from a stationary drum, which spreader arm is rotatably mounted on the support and supports a gripping arm for coiling and uncoiling of the cable.

12. A device according to claim 11, including means for rotating the gripping arm secured to the support.

13. A device according to claim 12, wherein the means for rotating the gripping arm comprises at least one of a chain and belt.

14. A device according to claim 12, wherein the means for rotating the drum including a screw drive.

15. A device according to claim 6, wherein the drum means comprises an additional drum, the coiling of which is arranged to take place by means of the intermediate storage means, which drum, during uncoiling, is arranged separate from the said intermediate storage means.

16. A device according to claim 6, wherein the intermediate storage means comprises two intermediate storage means, each including a capstan.

17. A device according to claim 6, wherein the intermediate storage means comprises a dual drum capstan, including a swingable drum swinging arms to alternately pass the drum between a coiling position at the support and an outer coiling position.

18. A device according to claim 6, including mobile means for supporting each cable feeder in separate planes under and above the stator frame.

19. A device according to claim 18, including a fork lift truck for supporting the first cable feeder on a floor level under the stator frame, and an overhead support for slidably carrying the other cable feeder in a plane above the stator frame.

20. A method of mounting a winding on a stator for a generator comprising the steps:

a) using cable for the winding, the winding being wound with a number of cables of predetermined lengths for the intended winding of the stator, b) placing the center of the cable of about half the predetermined length at a location in a slot of the stator representing the middle of the intended coil arc, c) starting from the center of the coil arc, winding the first half cable length onto the stator to form a first coil arc half and part of a complete stator winding turn, and d) winding the remaining half cable length onto the stator starting from the said center of the coil arc and in the opposite direction relative to the winding of the first half cable length so as to form the other half of the coil arc on the stator and another part of the complete stator winding wherein the high-voltage cable comprises a core with a plurality of conductive wires, an inner semiconducting layer surrounding the core, an insulating layer surrounding the inner semiconductive layer and an outer semi-conductive layer surrounding the insulating layer.

21. A method of mounting a winding on a stator for a generator comprising the steps:
   a) using cable for the winding, the winding being wound with a number of cables of predetermined lengths for the intended winding of the stator,
   b) placing the center of the cable of about half the predetermined length at a location in a slot of the stator representing the middle of the intended coil arc,
   c) starting from the center of the coil arc, winding the first half cable length onto the stator to form a first coil arc half and part of a complete stator winding turn, and
   d) winding the remaining half cable length onto the stator starting from the said center of the coil arc and in the opposite direction relative to the winding of the first half cable length so as to form the other half of the coil arc on the stator and another part of the complete stator winding wherein
      the high-voltage cable has a diameter of about 20 mm to about 200 mm and a conductor area of about 80 $mm^2$ to about 3000 $mm^2$.

* * * * *